United States Patent
Sreepada et al.

(10) Patent No.: US 12,308,896 B2
(45) Date of Patent: May 20, 2025

(54) SYSTEMS, METHODS, AND DEVICES FOR CHANNEL INTERFERENCE DETECTION IN WIRELESS DEVICES

(71) Applicant: Cypress Semiconductor Corporation, San Jose, CA (US)

(72) Inventors: Sridhan Kalasi Sreepada, Bangalore (IN); Prasanna Sethuraman, Bangalore (IN); Ayush Sood, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 129 days.

(21) Appl. No.: 17/502,413

(22) Filed: Oct. 15, 2021

(65) Prior Publication Data

US 2023/0117788 A1 Apr. 20, 2023

(51) Int. Cl.
*H04B 17/345* (2015.01)
*H04B 17/318* (2015.01)
(Continued)

(52) U.S. Cl.
CPC ......... *H04B 17/345* (2015.01); *H04B 17/318* (2015.01); *H04L 27/2666* (2013.01); *H04W 72/541* (2023.01)

(58) Field of Classification Search
CPC ........... H04W 72/541; H04W 72/0433; H04W 72/044; H04W 72/0453; H04W 72/048; H04W 72/082; H04W 72/085; H04W 72/542; H04W 72/1231; H04W 72/23; H04W 72/52; H04W 72/56; H04W 16/32; H04W 16/14; H04W 24/02; H04W 24/06; H04W 24/08; H04W 24/10; H04W 28/0236; H04W 28/04; H04W 28/02; H04W 28/0289; H04W 36/08; H04W 36/20; H04W 40/12; H04W 40/02; H04W 88/08; H04W 88/085; H04W 92/20; H04W 52/223; H04W 52/245; H04L 1/0021; H04L 1/0026; H04L 1/242; H04L 27/2666;
(Continued)

(56) References Cited

U.S. PATENT DOCUMENTS

| 2006/0045200 A1* | 3/2006 | Bocquet | H04L 27/2647 375/267 |
| 2009/0190641 A1* | 7/2009 | Yang | H04N 17/004 375/224 |

(Continued)

*Primary Examiner* — Un C Cho
*Assistant Examiner* — Rasha K Fayed (57) ABSTRACT

Systems, methods, and devices perform channel interference detection for wireless devices. Methods include receiving a signal at a wireless device, the signal including at least one data subcarrier and one or more guard subcarriers. Methods also include determining, using processing logic, that one or more guard subcarriers are available for adjacent channel interference (ACI) detection, measuring, using the processing logic, a power of each of the one or more guard subcarriers and a total power of the one or more guard subcarriers, and determining, using the processing logic, an ACI is present based, at least in part, on the measurements of the one or more guard subcarriers. Methods further include performing, using the processing logic, one or more deweighing operations based on one or more identified features of the ACI.

20 Claims, 9 Drawing Sheets

(51) Int. Cl.
*H04L 27/26* (2006.01)
*H04W 72/541* (2023.01)

(58) Field of Classification Search
CPC . H04L 27/0014; H04L 27/02; H04L 27/3488; H04L 5/0073; H04L 5/001; H04L 5/0053; H04L 5/006; H04L 5/0082; H04L 5/0032; H04L 5/1469; H04L 5/0055; H04L 25/08; H04B 7/18517; H04B 7/18519; H04B 7/0617; H04B 17/345; H04B 17/318; H04B 17/309; H04B 17/336; H04B 17/0085; H04B 17/373; H04B 17/00; H04B 1/1036; H04B 1/7097; H04B 1/109; H04B 1/10; H04B 1/1027; H04B 1/16; H04B 1/1661; H04B 1/12; H04B 2001/1045; H04B 2001/1054; H04B 2001/1072; H04B 2001/1063; Y02D 30/70

See application file for complete search history.

(56) References Cited

U.S. PATENT DOCUMENTS

| | | | | |
|---|---|---|---|---|
| 2010/0008217 A1* | 1/2010 | Ding | ............. | H04L 1/206 370/210 |
| 2010/0238358 A1* | 9/2010 | Ma | ............. | H04N 5/21 375/346 |
| 2011/0182338 A1* | 7/2011 | Li | ............. | H04B 1/109 375/224 |
| 2012/0224484 A1* | 9/2012 | Babiarz | ............. | H04L 41/5019 370/235 |
| 2013/0288727 A1* | 10/2013 | Chirayil | ............. | H04B 1/715 455/501 |
| 2013/0308731 A1* | 11/2013 | Hsin | ............. | H04B 1/1036 375/345 |
| 2015/0201419 A1* | 7/2015 | Zhou | ............. | H04L 1/00 370/329 |
| 2015/0358183 A1* | 12/2015 | Soga | ............. | H04L 27/2613 370/329 |
| 2016/0277121 A1* | 9/2016 | Millar | ............. | H04B 10/612 |
| 2018/0287830 A1* | 10/2018 | Merlin | ............. | H04B 17/336 |
| 2019/0120955 A1* | 4/2019 | Zhong | ............. | G01S 13/584 |
| 2019/0319657 A1* | 10/2019 | Roy | ............. | H04L 25/03993 |
| 2020/0235769 A1* | 7/2020 | Wilhelmsson | ............. | H04W 52/0235 |
| 2020/0389250 A1* | 12/2020 | Goichberg | ............. | H04L 1/0003 |
| 2021/0241426 A1* | 8/2021 | Kelly | ............. | G06T 5/10 |
| 2021/0345156 A1* | 11/2021 | Baek | ............. | H04W 28/0289 |
| 2021/0389474 A1* | 12/2021 | Hamzeh | ............. | H04B 7/18517 |
| 2022/0167271 A1* | 5/2022 | Kuncham | ............. | H03M 1/185 |
| 2022/0209891 A1* | 6/2022 | Krishnamurthy | ... | H04L 25/0202 |
| 2022/0260413 A1* | 8/2022 | Perruchot | ............. | G01J 1/42 |
| 2023/0014069 A1* | 1/2023 | Isaac | ............. | H04B 17/318 |
| 2023/0216715 A1* | 7/2023 | Hui | ............. | H04L 5/0041 375/262 |
| 2023/0388171 A1* | 11/2023 | Bogdan | ............. | H03H 17/0251 |

* cited by examiner

SYSTEMS, METHODS, AND DEVICES FOR CHANNEL INTERFERENCE DETECTION IN WIRELESS DEVICES

TECHNICAL FIELD

This disclosure generally relates to wireless devices, and more specifically, to detection of interference in communications channels associated with such wireless devices.

BACKGROUND

Wireless devices may communicate with each other via one or more communications modalities, such as a WiFi connection or a Bluetooth connection. Accordingly, such wireless communication may be performed in a manner compliant with a wireless communications protocol. Moreover, such wireless devices may include various hardware components to facilitate such communication. For example, wireless devices may include transmission media and reception media that may include one or more antennas and transceivers. Conventional techniques for handling data transmissions between wireless devices and receiving data packets in accordance with various communications protocols remain limited because they are not able to efficiently and effectively detect interferences that may be present on frequencies and channels used for such data transmissions.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may transmit data packets and symbols to and from each other in accordance with a particular wireless communications protocol. Such a protocol may have a designated range of frequencies used for data transmission. Such a range of frequencies may be partitioned into designated frequency bands, also referred to as channels, that may be further divided into multiple subcarriers. A particular channel may have designated subcarriers that are configured as guard subcarriers. Such guard subcarriers might not be used for data transmission, but may instead be reserved as a buffer or separator from other adjacent channels. Accordingly, a particular channel may have a left or lower guard subcarrier as well as a right or upper subcarrier.

Data transmissions on channels that are next to or adjacent to each other may cause interference with each other. For example, activity on one channel may inadvertently affect signals on adjacent frequencies of adjacent channels, and thus interfere with operation of those adjacent channels. Existing techniques for detecting such sources of interference are limited because they are not able to accurately and efficiently localize sources of such interference. For example, they are not able to efficiently discern if interference on one channel is coming from an upper or lower adjacent channel. Moreover, existing techniques may rely on resource intensive implementations that require analyzing a signal before filtering and while the signal is still in a time domain, as well as rely on an analysis of out-of-band signals. Accordingly, existing techniques rely on resource intensive RF front end implementations, and are not able to determine where the interference is present.

Embodiments disclosed herein provide efficient and effective detection and localization of interferences that may be experienced by wireless devices. As will be discussed in greater detail below, embodiments disclosed herein enable the use of power measurements of guard subcarriers as well as a total power of a signal to determine if interference is present, and if so, further determine which adjacent channel is generating the interference. In this way, embodiments disclosed herein may detect interference on a particular channel as well as determine if interference is coming from an upper adjacent channel or a lower adjacent channel, and with improved sensitivity. As will also be discussed in greater detail below, embodiments disclosed herein may be implemented via a processing device in the frequency domain, thus avoiding resource intensive front end implementations that may be implemented before RF filters.

Figure 1:
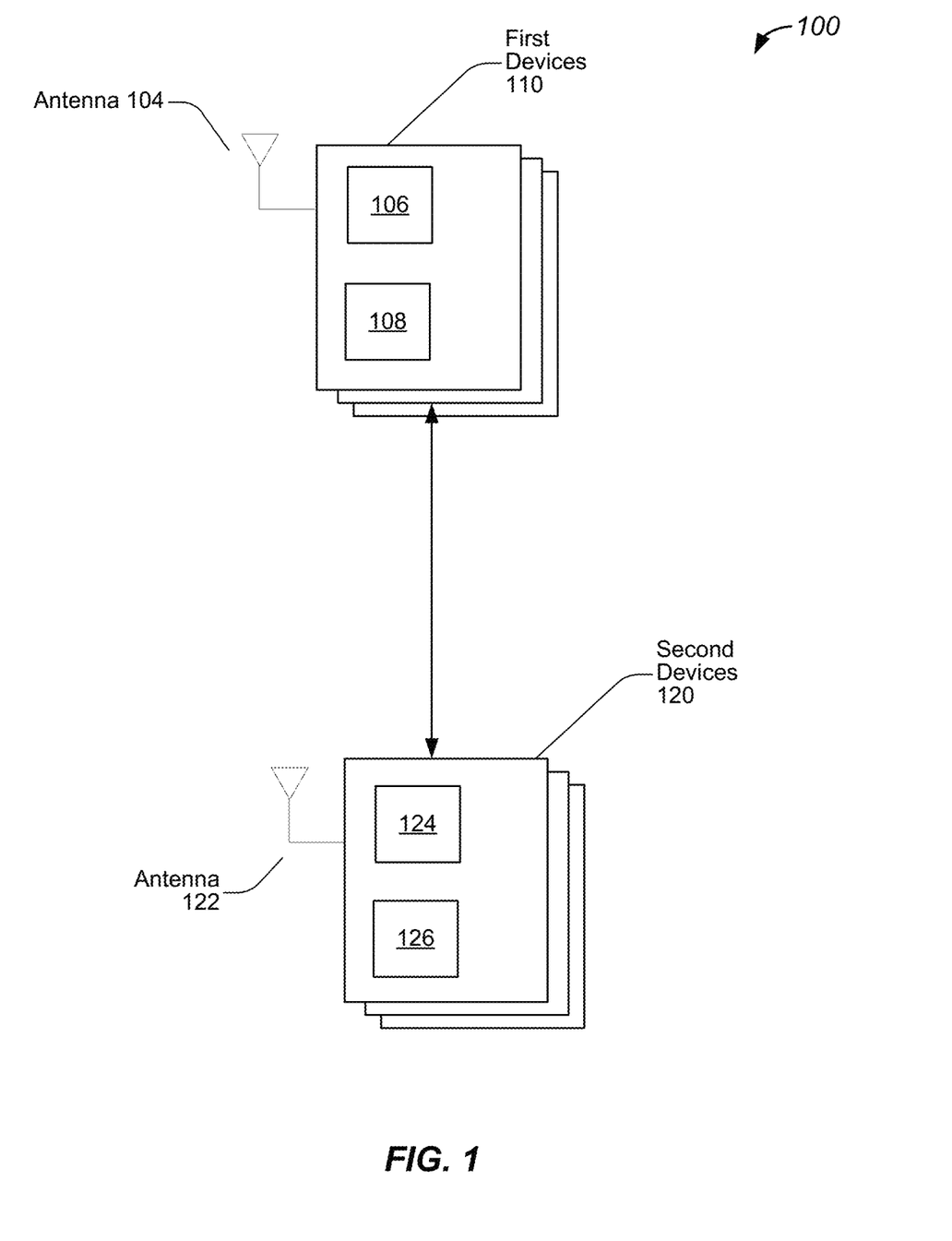
FIG. 1 illustrates an example of a system for interference detection for wireless devices, configured in accordance with some embodiments.

FIG. 1 illustrates an example of a system for interference detection for wireless devices, configured in accordance with some embodiments. As discussed above, wireless devices may communicate with each other over particular frequency bands, also referred to as channels, that may be divided into multiple subcarriers. Such subcarriers may include guard subcarriers that are not used, but provide a buffer between adjacent channels. As will be discussed in greater detail below, a system, such as system 100, may be configured to utilize guard subcarriers to implement improved channel interference detection and localization.

In various embodiments, system 100 may include first devices 110 which may be wireless devices. As discussed above, such wireless devices may be compatible with one or more wireless communications protocols, such as a WiFi protocol. In one example, the WiFi protocol may be compatible with an 802.11a or 802.11g specification. It will be appreciated that embodiments disclosed herein may be compatible with any suitable wireless communications protocol.

For example embodiments disclosed herein may be implemented with any communications protocol using orthogonal frequency-division multiplexing (OFDM), such as Bluetooth Low Energy. Moreover, such wireless devices may be smart devices, such as those found in wearable devices, or may be monitoring devices, such as those found in smart buildings, environmental monitoring, and energy management. For example, such devices may be industrial sensors, other sensors used in asset tracking, as well as any other suitable internet of things (IoT) device. Moreover, wireless devices may be any suitable device, such as those found in cars, other vehicles, and even medical implants.

As shown in FIG. 1, various wireless devices may be in communication with each other via one or more wireless communications mediums. As shown in FIG. 1, first devices 110 may each include an antenna, such as antenna 104. First devices 110 may also include processing device 108 as well as transceiver 106. As will be discussed in greater detail below, such processing devices and transceivers are configured to send and receive data packets between each other, and utilize portions of data packets for the purposes of data packet detection and synchronization events. Moreover, as will be discussed in greater detail below, different components of first devices 110 may be configured to perform scanning operations and associated computations to detect and identify adjacent channel interferences that may be present with sending and receiving such data packets.

In some embodiments, system 100 may further include second devices 120 which may also be wireless devices. As similarly discussed above, second devices 120 may be compatible with one or more wireless communications protocols, such as a WiFi protocol. In one example, the WiFi protocol may be compatible with an 802.11A/G specification. Moreover, second devices 120 may also be smart devices or other devices, such as IoT devices, devices found in cars, other vehicles, and medical implants. In various embodiments, second devices 120 may be different types of devices than first devices 110. As discussed above, each of second devices 120 may include an antenna, such as antenna 122, as well as processing device 126 and transceiver 124, which may also be configured to establish communications connections with other devices, and transmit and receive data in the form of data packets via such communications connections. Accordingly, as discussed above, second devices 120 may also be configured to perform scanning operations and associated computations to detect and identify adjacent channel interferences that may be present with sending and receiving such data packets.

Figure 2:
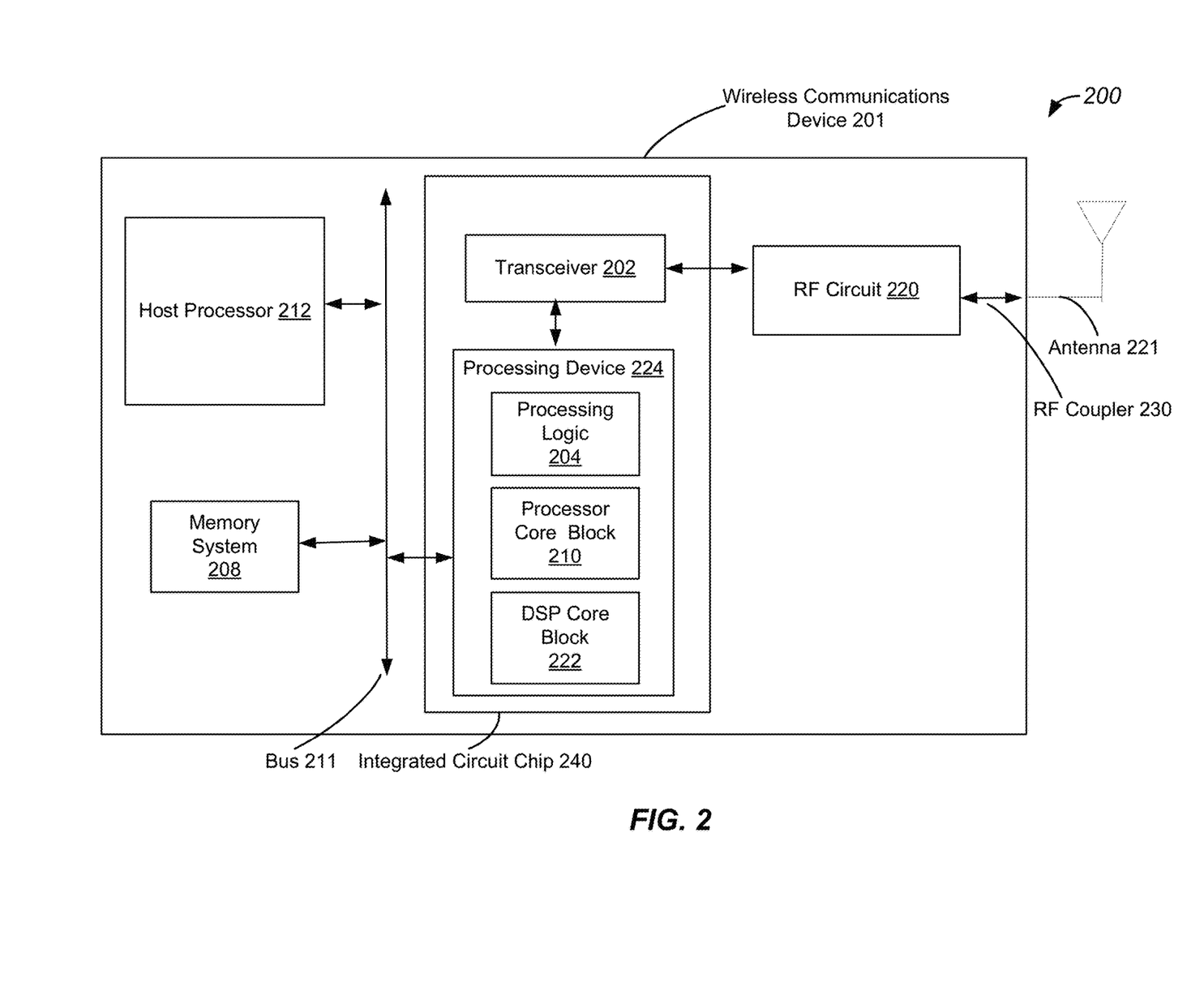
FIG. 2 illustrates an example of another system for interference detection for wireless devices, configured in accordance with some embodiments.

FIG. 2 illustrates an example of another system for interference detection for wireless devices, configured in accordance with some embodiments. More specifically, FIG. 2 illustrates an example of a system, such as system 200, that may include wireless device 201. It will be appreciated that wireless device 201 may be one of any of first devices 110 or second devices 120 discussed above. In various embodiments, wireless device 201 includes a transceiver, such as transceiver 202, which may be a transceiver such as transceivers 106 and 124 discussed above. In one example, system 200 includes transceiver 202 which is configured to transmit and receive signals using a communications medium that may include antenna 221. Accordingly, transceiver 202 may include a transmitter having one or more components forming a portion of a transmit path, and may also include a receiver having one or more components forming a portion of a receive path.

As noted above, transceiver 202 may be included in a WiFi radio, and may be compatible with a WiFi communications protocol. Accordingly, packets disclosed herein may be WiFi packets. In various embodiments, as will be discussed in greater detail below, components of a receive chain used to receive, demodulate, and decode data values included in a data packet may be included in transceiver 202 as well as processing device 224 discussed in greater detail below. For example, transceiver 202 may include one or more analog buffers and filters included in a receive chain and one or more components of a physical (PHY) layer may be implemented in components of processing device 224.

Accordingly, system 200 additionally includes processing device 224 which may include one or more processor cores. In various embodiments, processing device 224 includes one or more components configured to implement a medium access control (MAC) layer that is configured to control hardware associated with a wireless transmission medium, such as that associated with a WiFi transmission medium, as well as implement various coordination functions. Processing device 224 may also include one or more components configured to implement the PHY layer of the WiFi protocol as well as a data link layer of the WiFi protocol. Accordingly, processing device 224 may include one or more components of the PHY layer configured to handle establishment and termination of connections to a communications medium, resource sharing operations, as well as modulation and demodulation operations.

In one example, processing device 224 may include processor core block 210 that comprises multiple processor cores which are each configured to implement specific portions of a wireless protocol interface. For example, a WiFi protocol may be implemented using a WiFi stack in which software is implemented as a stack of layers, and such layers are configured to compartmentalize specific functions utilized to implement the WiFi communications protocol. For example, processor core block 210 may be configured to implement a driver, such as a WiFi driver. Processing device 224 may further include digital signal processor (DSP) core block 222 which may be configured to include microcode.

In various embodiments, system 200 further includes processing logic 204 which may be implemented using circuitry and/or one or more processor cores, and may be implemented using an integrated circuit. In various embodiments, processing logic 204 may be implemented in firmware of the integrated circuit. Accordingly, processing logic 204 is configured to implement one or more components of processing device 224, such as processing logic used to detect channel interferences. In some embodiments, such components may be implemented with other portions of the PHY layer in processor core block 210. Thus, processing logic 204 may include one or more components that are configured to perform channel interference operations discussed above and that will be described in greater detail below. While FIG. 2 illustrates processing logic 204 as separate from processor core block 210 discussed below, it will be appreciated that processing logic 204 may be implemented as part of processor core block 210 and may be included within processor core block 210.

System 200 further includes radio frequency (RF) circuit 220 which is coupled to antenna 221. In various embodiments, RF circuit 220 may include various components such as an RF switch, a diplexer, and a filter. While FIG. 2 illustrates system 200 as having a single antenna, it will be appreciated that system 200 may have multiple antennas. Accordingly, RF circuit 220 may be configured to select an antenna for transmission/reception, and may be configured to provide coupling between the selected antenna, such as antenna 221, and other components of system 200 via a bus, such as bus 211.

System 200 includes memory system 208 which may include one or more memory devices configured to store one or more data values associated with channel interference operations discussed above and in greater detail below. Accordingly, memory system 208 includes storage device, which may be a non-volatile random-access memory (NVRAM) configured to store such data values, and may also include a cache that is configured to provide a local cache. In various embodiments, system 200 further includes host processor 212 which is configured to perform processing operations associated with system 200.

It will be appreciated that one or more of the above-described components may be implemented on a single chip, or on different chips. For example, transceiver 202 and processing device 224 may be implemented on the same integrated circuit chip, such as integrated circuit chip 240. In another example, transceiver 202 and processing device 224 may each be implemented on their own chip, and thus may be disposed separately as a multi-chip module or on a common substrate such as a printed circuit board (PCB). It will also be appreciated that components of system 200 may be implemented in the context of a low energy device, a smart device, an IoT device, or a vehicle such as an automobile. Accordingly, some components, such as integrated chip 240, may be implemented in a first location, while other components, such as antenna 221, may be implemented in second location, and coupling between the two may be implemented via a coupler such as RF coupler 230.

Figure 3:
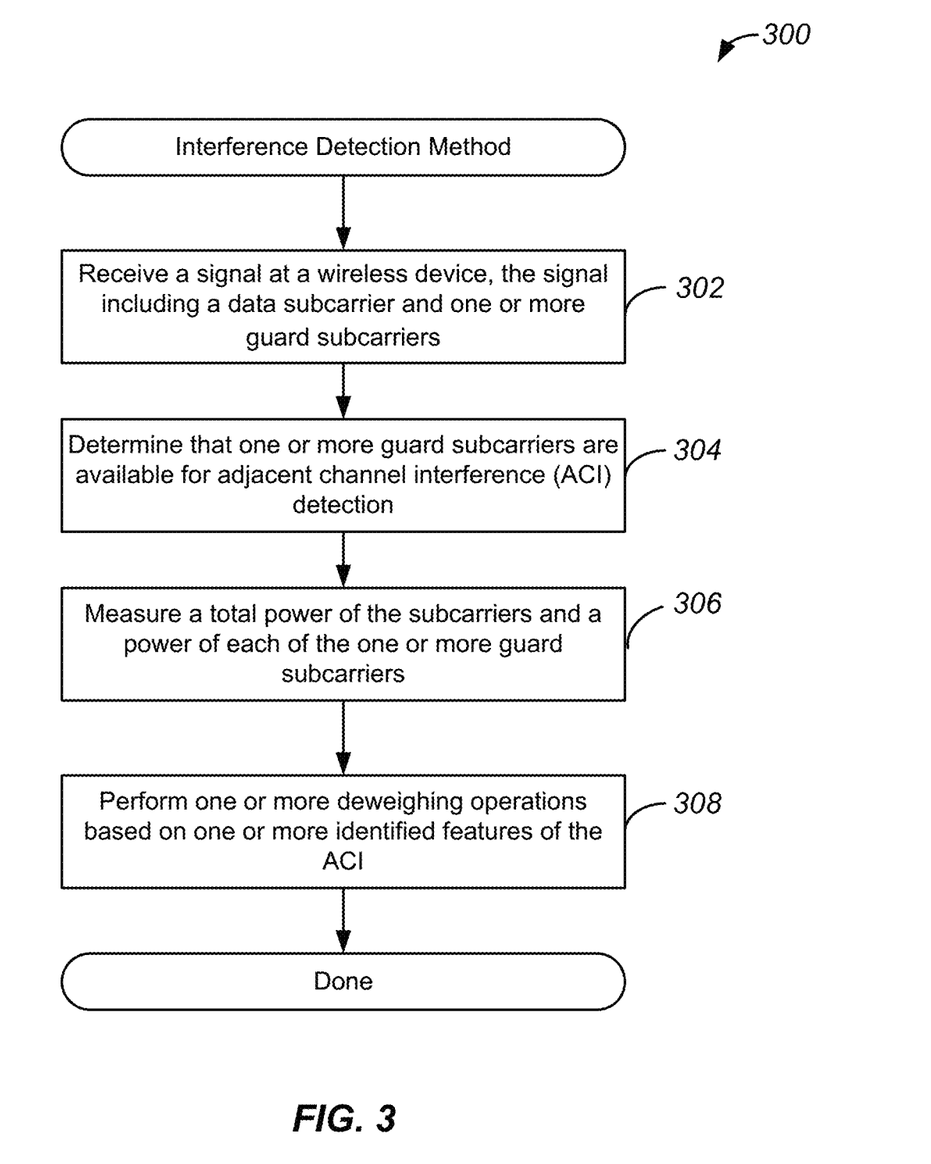
FIG. 3 illustrates an example of a method for interference detection for wireless devices, performed in accordance with some embodiments.

FIG. 3 illustrates an example of a method for interference detection for wireless devices, implemented in accordance with some embodiments. As discussed above, wireless devices may communicate with each other over frequency bands that may be divided into multiple subcarriers that may include guard subcarriers. As will be discussed in greater detail below, a method, such as method 300, may be implemented to utilize guard subcarriers to implement improved channel interference detection and localization.

Method 300 may perform operation 302 during which a signal may be received at a wireless device. In various embodiments, the signal may be used to transmit data in accordance with a wireless communications protocol. For example, the signal may include data symbols transmitted in accordance with a WiFi communications protocol. As similarly discussed above, the signal may be transmitted on a frequency band or channel that has one or more data subcarriers as well as one or more guard subcarriers.

Method 300 may perform operation 304 during which it may be determined that one or more guard subcarriers are available for adjacent channel interference (ACI) detection. Accordingly, it may be determined that the signal received on the guard subcarriers is sufficiently strong enough to be used for interference detection. As will be discussed in greater detail below, such a determination may be made based on one or more signal quality metrics.

Method 300 may perform operation 306 during which a total power of the signal may be measured. Moreover, a power of each of the guard subcarriers may be measured. Accordingly, during operation 306 a power measurement may be made for the total signal, as well as a left or lower guard subcarrier and a right or upper subcarrier. The measurements may be stored in a memory device. As will be discussed in greater detail below, the power measurements may be used to determine if an ACI is present, and if so, further identify features of the ACI. More specifically, particular combinations of measurements may be used to estimate a position of a detected ACI. For example, it may be determined that the ACI is on an upper guard subcarrier, and thus is coming from an upper adjacent channel.

Method 300 may perform operation 308 during which one or more deweighing operations may be performed based on one or more identified features of the ACI. As will be discussed in greater detail below, the deweighing operations may be one or more adjustments to parameters of encoding/decoding operations and equations used for signal transmission and reception. Such adjustments may include adjusting or modifying a noise variance term of such decoding equations to compensate for identified interference.

In various embodiments, the deweighing operations may be performed in the context of a log-likelihood ratio (LLR) used in signal decoding. In various embodiments, such signal noise might affect a variance of a curve represented by a sigma squared component of an input-output equation used for encoding/decoding of a signal, which may use OFDM. The deweighing operations may be performed to adjust the sigma squared component incorporate interference information and compensate for the changes made by the interference, thus increasing encoding/decoding performance. Accordingly, during operation 308, and as will be discussed in greater detail below, one or more deweighing operations may be identified based on the identified features of the ACI, and the deweighing operations may be performed to compensate for the ACI.

Figure 4:
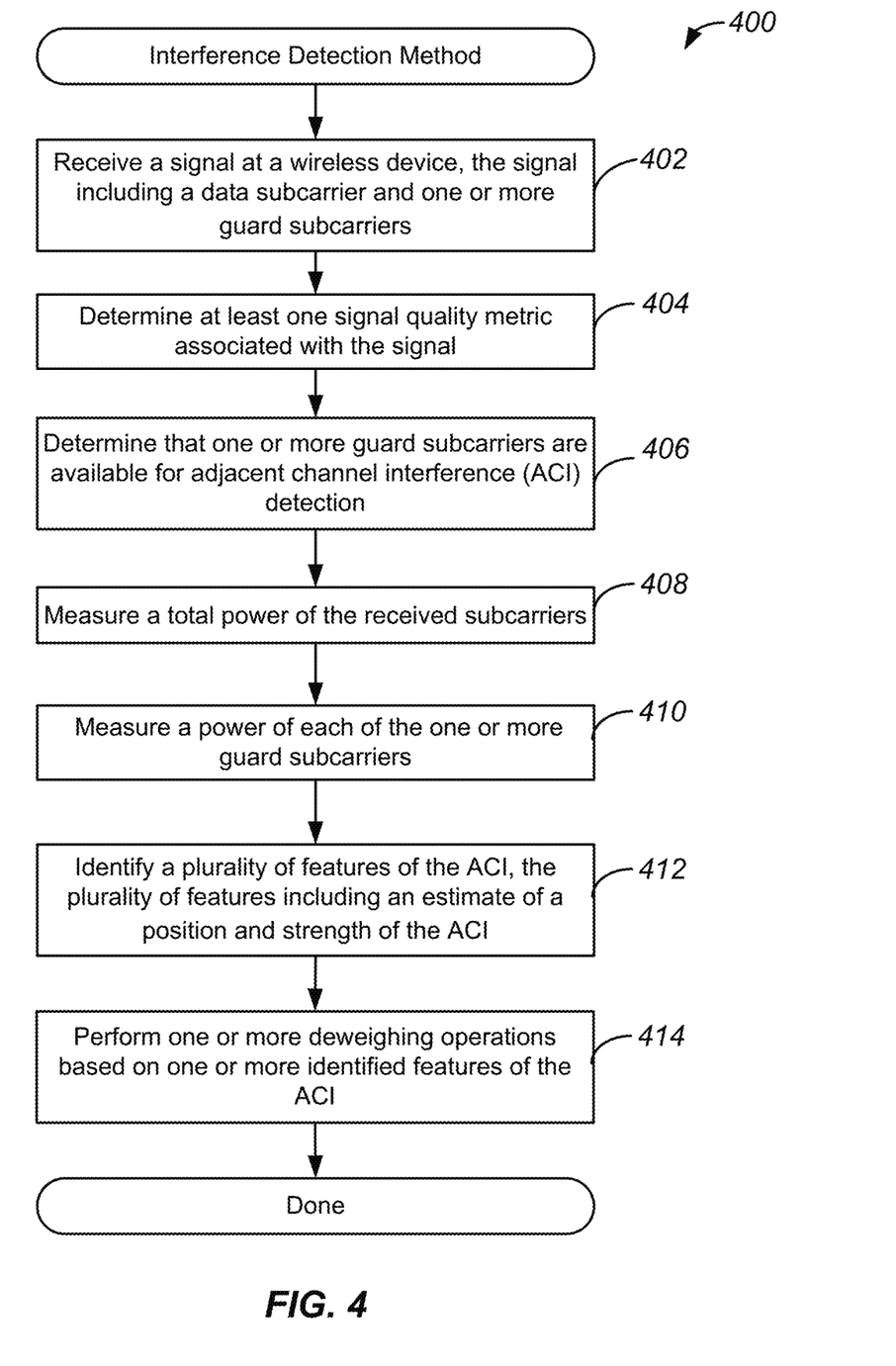
FIG. 4 illustrates an example of another method for interference detection for wireless devices, performed in accordance with some embodiments.

FIG. 4 illustrates an example of another method for interference detection for wireless devices, performed in accordance with some embodiments. As discussed above, wireless devices may communicate with each other over frequency bands that may be divided into multiple subcarriers that may include guard subcarriers. As will be discussed in greater detail below, a method, such as method 400, may be performed to utilize guard subcarriers to implement improved channel interference detection and localization. More specifically, channel interference may be detected, localized, and then mitigated via one or more deweighing operations.

Method 400 may perform operation 402 during which a signal may be received at a wireless device. As similarly discussed above, the signal may be used to transmit data in accordance with a wireless communications protocol. For example, the signal may include data symbols transmitted in accordance with a WiFi communications protocol. As also discussed above, the signal may be transmitted on a frequency band or channel that has one or more data subcarriers as well as one or more guard subcarriers. Accordingly, during operation 402, the signal may be received via a transceiver, and undergo a domain transformation, such as a fast Fourier transform (FFT) as part of the receiving, and via a component of a receive chain of the transceiver.

Method 400 may perform operation 404 during which at least one signal quality metric may be determined. Accordingly, as part of the receiving, one or more signal quality metrics may be determined. In some embodiments, the signal quality metric may be a signal strength metric that represents an overall strength of the signal received at the transceiver. In one example, the signal strength metric may be a received signal strength indicator (RSSI) value that may be computed by one or more components of the transceiver. It will be appreciated that while an RSSI value is described herein, any suitable signal quality metric may be determined during operation 404.

Method 400 may perform operation 406 during which it may be determined that one or more guard subcarriers are available for adjacent channel interference (ACI) detection. Accordingly, it may be determined that the signal received on the guard subcarriers is sufficiently strong enough to be used for interference detection. In various embodiments, such a determination may be made based on the signal quality metric determined at operation 404. For example, an RSSI value may be compared against a designated threshold value. If it is determined that the RSSI value is greater than the designated threshold value, the guard subcarriers may be determined to be available for adjacent channel interference. If the RSSI value is less than the designated threshold value, method 400 may terminate or an alternate interference detection technique may be implemented, such as a legacy interference detection technique.

Method 400 may perform operation 408 during which a total power of the signal may be measured. In various embodiments, the power measurement may be made by one or more components of a processing device at an output of the transceiver. Accordingly, during operation 408 a power measurement may be made for the total signal and the measurement may be stored in a memory device.

Method 400 may perform operation 410 during which a power of each of the guard subcarriers may be measured. As similarly noted above, the power measurements may be made by one or more components of a processing device at an output of the transceiver. Accordingly, during operation 410 a power measurement may be made for a left or lower guard subcarrier and a right or upper subcarrier, and the measurements may be stored in the memory device.

Method 400 may perform operation 412 during which a plurality of features of the ACI may be identified. In some embodiments, the plurality of features includes an estimate of a position and strength or amplitude of the ACI. Thus, as will be discussed in greater detail below with reference to FIG. 5, ratios of the measured power on each guard subcarrier may be computed relative to the total power measured. Moreover, comparisons of the computed ratios with designated values may be used to determine if interference is present, and if so, if the interference is present on a lower sideband or an upper sideband. As described herein, a sideband may be a group of subcarriers.

Method 400 may perform operation 414 during which one or more deweighing operations may be performed based on the one or more identified features of the ACI. As similarly discussed above, the deweighing operations may be performed in the context of a log-likelihood ratio (LLR) used in signal decoding. As discussed above, signal noise might affect a variance of a curve represented by a sigma squared component of an input-output equation, and the deweighing operations may be performed to adjust the sigma squared component and compensate for the changes made by the interference. In various embodiments, an input-output equation for a signal having k subcarriers may be given by equations 1 and 2 shown below, where I(k) denotes an interference at the $k^{th}$ subcarrier:

$$Y(k)=H(k)X(k)+I(k)+N(k) \ldots k \in \text{Data subcarriers} \quad (1)$$

$$Y(k)=I(k)+N(k) \ldots k \in \text{Guard subcarriers} \quad (2)$$

In various embodiments, H is a wireless channel, X is a transmitted signal, Y is a received signal, and I is an interference signal which can be either co-located or remotely located. Moreover, N(k) may be a gaussian random variable given by CN(0, $\sigma^2$) where $\sigma^2$ may have a known or estimated value. For example, $\sigma^2$ may initially be set to an initial designated value. In various embodiments, an estimated or expected signal over consecutive data symbols may be given by equation 3 shown below:

$$E\{Y(k)^*Y(k)\}=E\{|Y(k)|^2\}=E\{|I(k)|^2\}+E\{|N(k)|^2\},$$
$$k \in \text{guard subcarriers} \quad (3)$$

Assuming equation 4 shown below, equations 5 and 6 may provide a representation of Ĩ(k), which may be an estimate of interference strength over a noise floor:

$$\tilde{Y}(k)=E\{|Y(k)|^2\}, \tilde{I}(k)=E\{|I(k)|^2\} \quad (4)$$

$$\tilde{Y}(k)=\tilde{I}(k)+\sigma^2(k) \ldots k \in \text{guard subcarriers} \quad (5)$$

$$\tilde{I}(k)=\tilde{Y}(k)-\sigma^2(k) \ldots k \in \text{guard subcarriers} \quad (6)$$

As will be discussed in greater detail below, deweighing operations may include modification of the $\sigma^2$ term, which represents a noise variance, based on a determined interference strength and position. In this way, the determined interference strength and position may be used to adjust an input-output equation used to receive and decode data, and mitigate the effects of the interference, which may be an ACI. For example, a noise variance table may be adjusted to modify the $\sigma^2$ term and the input-output function. More specifically, a predetermined mapping may be used to map an amplitude and location of an ACI to an offset value for the $\sigma^2$ term. In some embodiments, the predetermined mapping may have been generated by an entity, such as a manufacturer, and may have been stored during an initial configuration of a wireless device.

Figure 5:
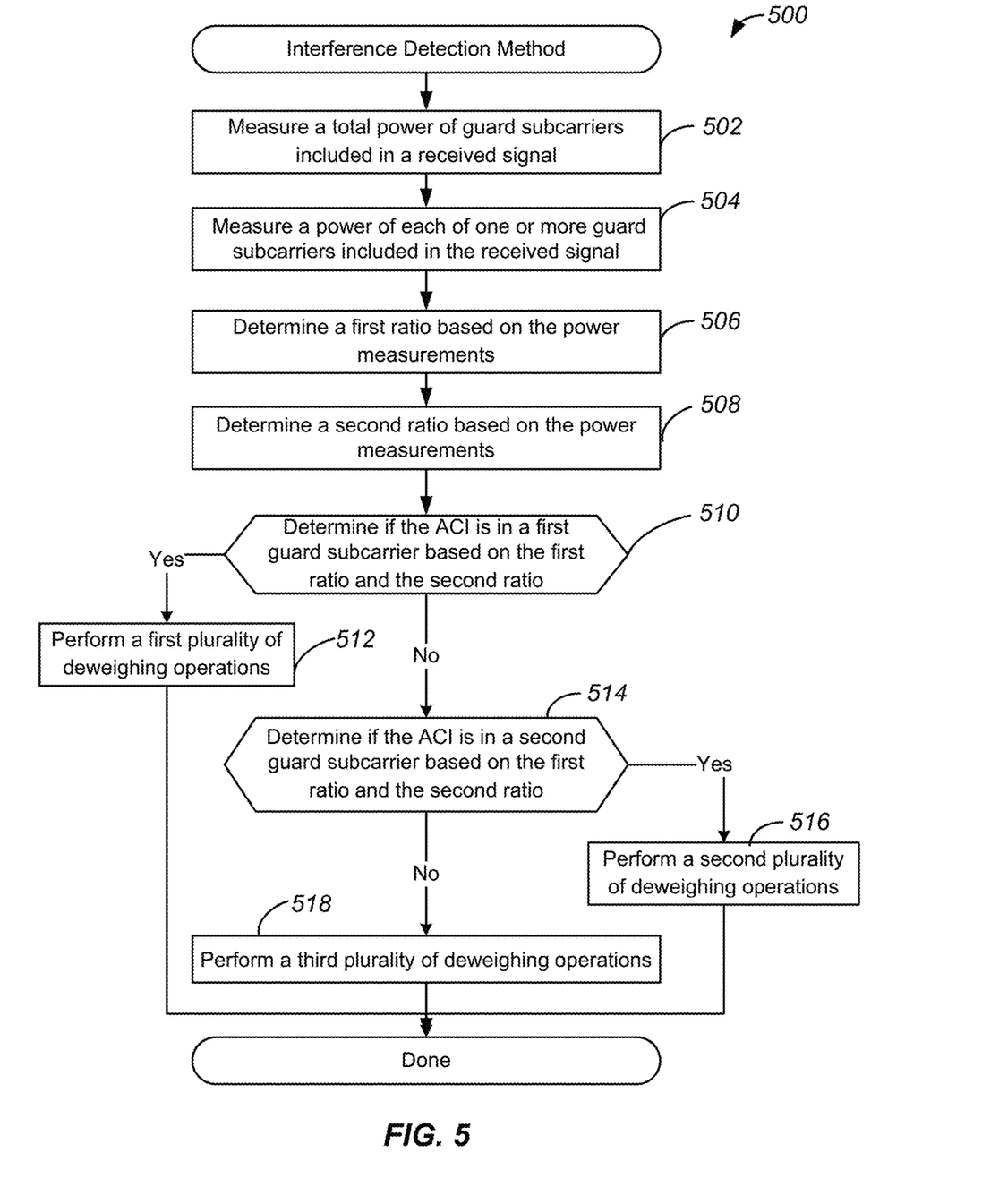
FIG. 5 illustrates an example of yet another method for interference detection for wireless devices, performed in accordance with some embodiments.

FIG. 5 illustrates an example of yet another method for interference detection for wireless devices, performed in accordance with some embodiments. As discussed above, embodiments disclosed herein are configured to provide improved channel interference detection and localization. As will be discussed in greater detail below, a method, such as method 500, may be performed to utilize power measurements associated with guard subcarriers for interference detection and localization. More specifically, a first channel interference may be detected and localized based on one or more computations associated with such power measurements.

Method 500 may perform operation 502 during which a total guard power of a received signal may be measured. As similarly discussed above, a power measurement may be made by one or more components of a processing device at an output of the transceiver. Accordingly, during operation 502 a power measurement may be made that measures a total power for the received signal, and the measurement may be stored in a memory device. In some embodiments, a total power measurement may be made by summing power measurements on guard subcarriers. Accordingly, such guard subcarriers may be identified using indices (represented by k in equation 7), and may be summed in accordance with equation 7 shown below:

$$P_T=\Sigma|\tilde{I}(k)|^2 \quad (7)$$

In one example, where a wireless device is implemented as part of a WiFi system that has 64 subcarriers, such subcarrier indices may be given by $k \in [-64:63]$, and equation 7 may be implemented as equation 8 shown below:

$$P_T=\Sigma|\tilde{I}(k)|^2, k \in [-32,-31,-30,29,30,31] \quad (8)$$

Method 500 may perform operation 504 during which a power of each of one or more guard subcarriers may be determined. Accordingly, as similarly discussed above, a power measurement may be made by one or more components of the processing device at an output of the transceiver.

Accordingly, during operation 504 a power measurement may be made for a lower guard subcarrier as well as an upper subcarrier, and the measurements may be stored in the memory device. In this way, the power measurement for each guard subcarrier may be constrained to a power measurement of frequencies included in that particular subcarrier.

In various embodiments, determinations of powers on guard subcarriers may be determined by performing summations for a designated number of guard subcarriers. For example, a left or lower guard subcarrier power may be determined by summing power measurements for a designated number of guard subcarriers on the left or lower side of a channel. Moreover, a right or upper guard subcarrier power may be determined by summing power measurements for a designated number of guard subcarriers on the right or upper side of a channel. In one example, the power for the lower or left guard subcarriers may be determined by summing a lower range of guard subcarriers, as shown by the constrained range of indices k in equation 9 shown below:

$$P_L = \Sigma |\tilde{I}(k)|^2, \; k \in [-32, -31, -30] \quad (9)$$

Moreover, the power for the right or upper guard subcarriers may be determined by summing an upper range of guard subcarriers, as shown by the constrained range of indices k in equation 10 shown below:

$$P_R = \Sigma |\tilde{I}(k)|^2, \; k \in [29, 30, 31] \quad (10)$$

Method 500 may perform operation 506 during which a first ratio may be determined based on the power measurements. In various embodiments, the first ratio is a ratio of the power on the left guard subcarrier, also referred to herein as a lower subcarrier, to the total measured power. In various embodiments, the first ratio may be determined by equation 11 provided below:

$$\frac{P_L}{P_T} \quad (11)$$

Method 500 may perform operation 508 during which a second ratio may be determined based on the power measurements. In various embodiments, the second ratio is a ratio of the power on the right guard subcarrier, also referred to herein as an upper subcarrier, to the total measured power. In various embodiments, the second ratio may be determined by equation 12 provided below:

$$\frac{P_R}{P_T} \quad (12)$$

Method 500 may perform operation 510 during which it may be determined if the ACI is in a first guard subcarrier based on the first ratio and the second ratio. Accordingly, the first ratio and the second ratio may be compared against a first designated value to determine if the interference is on the first guard subcarrier. More specifically, it may be determined if the result of the first ratio minus the second ratio is greater than the first designated value. If so, it may be determined that the interference is on the first guard subcarrier, which may be a left or lower guard subcarrier. Such a determination may be made using equation 13 shown below:

$$\frac{P_L}{P_T} - \frac{P_R}{P_T} > \delta \quad (13)$$

In equation 13, the delta term may be a programmable parameter. For example, for a given interference threshold, such as −50 dBm, $P_T$ may be greater than −50 dBm. Accordingly, δ may be determined by $1-(P_R/P_T)$.

Accordingly, as shown in equation 8, if the first ratio minus the second ratio is greater than the first designated value, it may be determined that the interference is present, and is located on the left or lower guard subcarrier. As discussed above, this determination may be used to configure one or more deweighing operations. Accordingly, if it is determined during operation 510 that the interference is present, and is located on the left or lower guard subcarrier, method 500 may proceed to operation 512 during which a first plurality of deweighing operations may be performed. In this way, deweighing operations may be targeted to a particular guard subcarrier based on the detected interference. In one example, if interference is detected on a lower guard subcarrier, deweighing operations may be performed for only the lower guard subcarriers. Moreover, deweighing operations may be performed proportional to a proximity of a guard subcarrier to a lower edge subcarrier, where deweighing is decreased as distance from the lower edge subcarrier increases and a distance from the data subcarrier decreases. Such deweighing may be implemented based on equation 14 shown below:

$$ACI_L/(k-k_{edge}+1)^2 \quad (14)$$

In various embodiments, a strength of an interference on the left or lower guard subcarrier may be determined based on equation 15 shown below:

$$ACI_L = P_L - 3\sigma^2 \quad (15)$$

Returning to operation 510, if it is determined that the first ratio minus the second ratio is not greater than the first designated value, method 500 may proceed to operation 514 during which it may be determined if the first ratio minus the second ratio is less than a second designated value. Such a determination may be made based on equation 16 shown below:

$$\frac{P_L}{P_T} - \frac{P_R}{P_T} < -\delta \quad (16)$$

Accordingly, as shown in equation 16, if the first ratio minus the second ratio is less than the second designated value, it may be determined that the interference is present, and is located on the right or upper guard subcarrier. As discussed above, this determination may be used to configure one or more deweighing operations. Accordingly, if it is determined during operation 514 that the interference is present, and is located on the right or upper guard subcarrier, method 500 may proceed to operation 516 during which a second plurality of deweighing operations may be performed. As similarly discussed above, deweighing operations may be targeted to a particular guard subcarrier based on the detected interference. In one example, if interference is detected on an upper guard subcarrier, deweighing operations may be performed for only the upper guard subcarriers. Moreover, deweighing operations may be performed proportional to a proximity of a guard subcarrier to an upper edge subcarrier, where deweighing is decreased as distance from the upper edge subcarrier increases and a distance from the data subcarrier decreases. Such deweighing may be implemented based on equation 17 shown below:

$$ACI_R/(k-k_{edge}+1)^2 \quad (17)$$

In various embodiments, a strength of an interference on the left or lower guard subcarrier may be determined based on equation 18 shown below:

$$ACI_R = P_R - 3\sigma^2 \quad (18)$$

Returning to operation 514, if it is determined that the first ratio minus the second ratio is not less than the second designated value, it may be determined that interference is present on both the lower and upper guard subcarriers, and method 500 may proceed to operation 518 during which a third plurality of deweighing operations may be performed. In various embodiments, the third plurality of deweighing operations may include a combination of the first and second pluralities of deweighing operations. Accordingly, the deweighing operations may be applied for both lower and upper guard subcarriers. Moreover, a strength of an interference determined to be on both the lower and upper guard subcarriers may be determined based on a summation of results of equations 15 and 18 discussed above.

Figure 6:
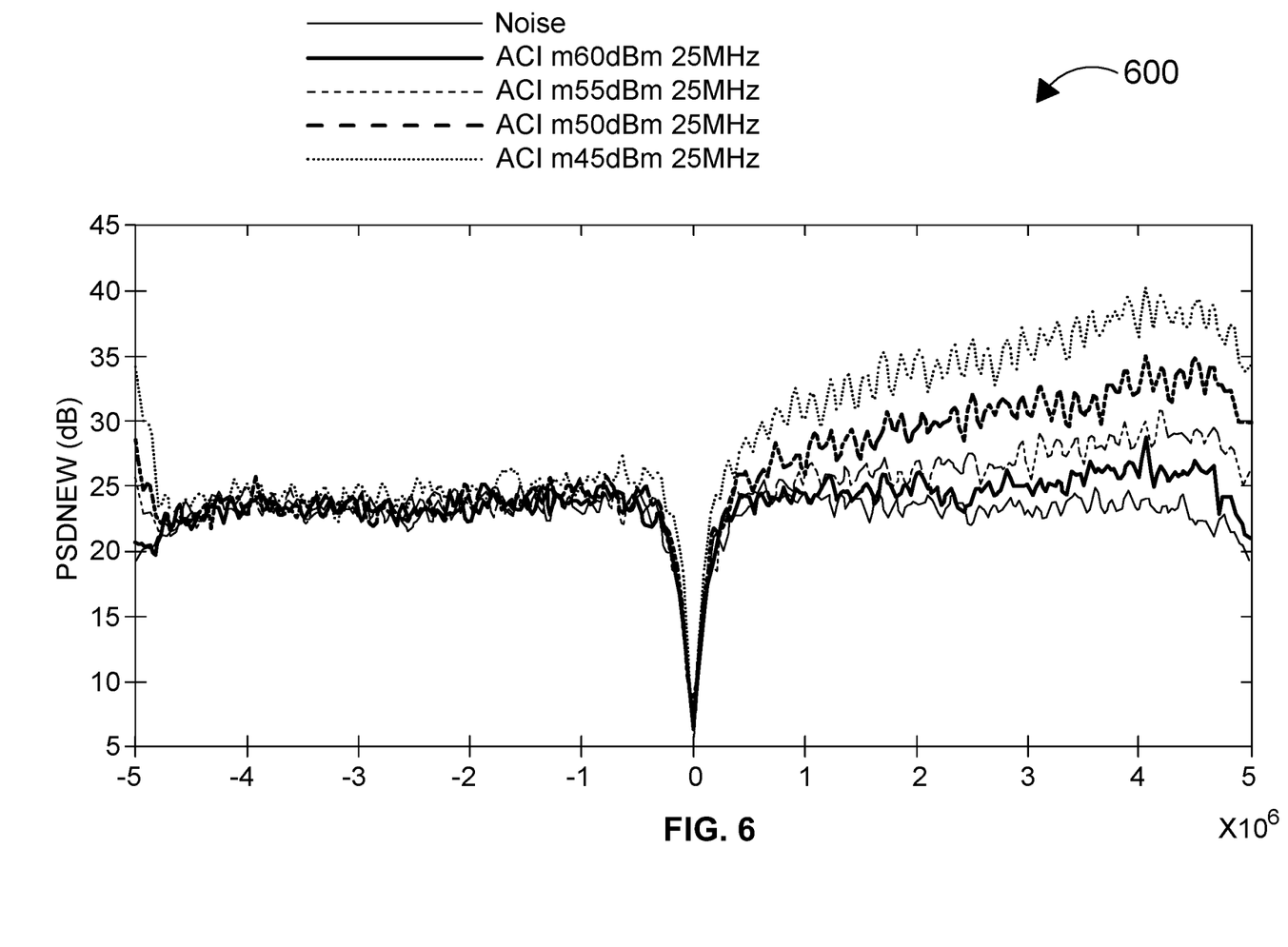
FIG. 6 illustrates an example of a diagram of power measurements, performed in accordance with some embodiments.

FIG. 6 illustrates yet another example of a diagram of power measurements, implemented in accordance with some embodiments. Accordingly, image 600 illustrates an example of a power spectrum diagram in which there is no signal of interest but noise is present as well as interference from an adjacent channel. As shown in image 600, an ACI is present on the upper sideband, and noise variance increases with an increased amplitude of the ACI. Accordingly, the power spectrum shown in image 600 indicates that when an ACI is detected, an estimated noise variance should be mitigated based on an estimated strength and position of the ACI.

Figure 7:
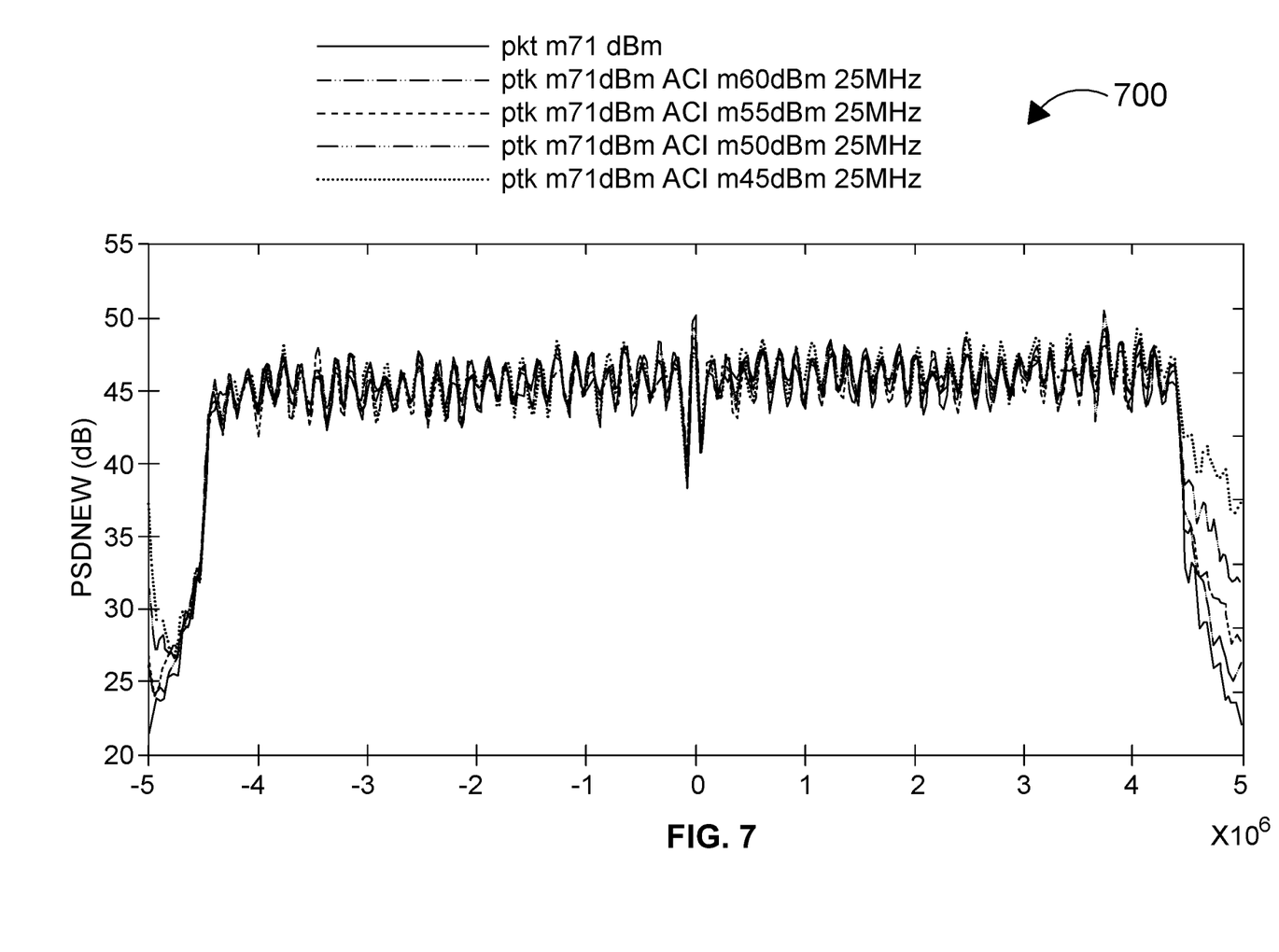
FIG. 7 illustrates another example of a diagram of power measurements, performed in accordance with some embodiments.

FIG. 7 illustrates an example of a diagram of power measurements, implemented in accordance with some embodiments. Accordingly, image 700 illustrates an example of a power spectrum diagram in which a signal of interest is captured on a first channel. As shown towards the right side of image 700, an ACI is present and results in interference seen on the upper guard subcarrier. Moreover, the amplitude of the interference correlates to the amplitude of the activity on the adjacent channel.

Figure 8:
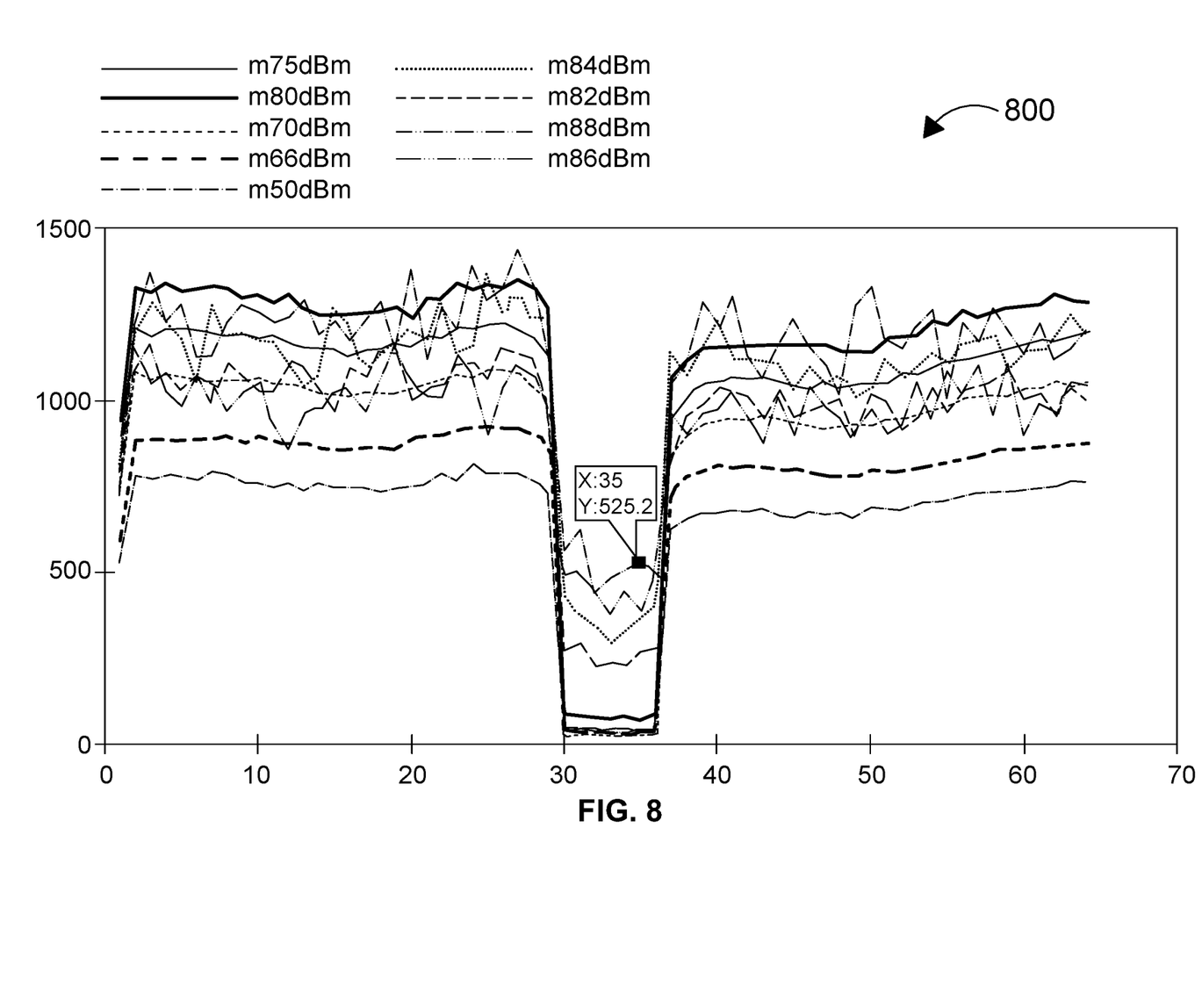
FIG. 8 illustrates yet another example of a diagram of power measurements, performed in accordance with some embodiments.

FIG. 8 illustrates another example of a diagram of power measurements, implemented in accordance with some embodiments. Thus, image 800 illustrates an example of an FFT output having varying levels of a signal of interest with no interference present. For example, signals with RSSI levels less than −80 dBm do not have an interference present and show a relatively flat consistent line across the frequencies of interest. However, signals with RSSI levels greater than −80 dBm, signal power leaks onto the guard subcarriers and can be detected. Accordingly, in one example, for guard subcarriers to be used for interference detection, an RSSI value of −80 dBm may be used as a threshold.

Figure 9:
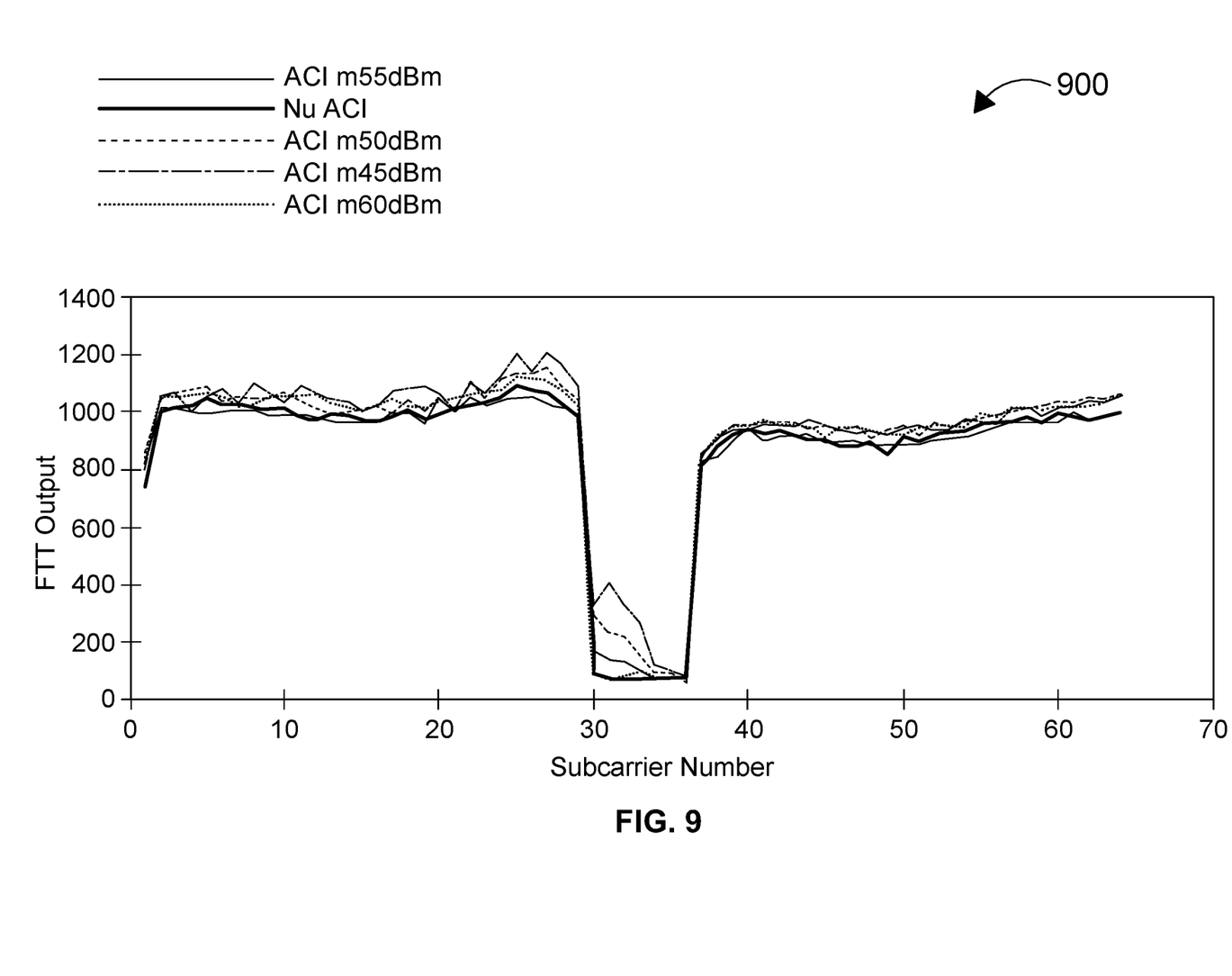
FIG. 9 illustrates an additional example of a diagram of power measurements, performed in accordance with some embodiments.

FIG. 9 illustrates an additional example of a diagram of power measurements, implemented in accordance with some embodiments. Accordingly, image 900 illustrates an example of an FFT output having varying levels of an interference, such as an ACI. As shown in image 900, increased amplitudes of the ACI result in increased leakage power and amplitudes of the ACI on guard subcarriers. Thus, by determining which subcarriers the ACI has increased, embodiments disclosed herein may identify subcarriers where the ACI is present as well as also identify a strength of the ACI.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
receiving a signal at a wireless device, the signal comprising at least one data subcarrier and one or more guard subcarriers, the one or more guard subcarriers being at edges of a transmission band;
determining, using processing logic, that one or more guard subcarriers are available for adjacent channel interference (ACI) detection based, at least in part, on a signal quality metric;
measuring, using the processing logic, a power of each of the one or more guard subcarriers and a total power of the one or more guard subcarriers;
determining, using the processing logic, an ACI is present at an estimated position relative to the at least one data subcarrier based, at least in part, on the measurements of the one or more guard subcarriers; and
performing, using the processing logic, one or more deweighing operations comprising modifying a noise variance term of an input-output equation used by a communications protocol for signal encoding/decoding of data, the modifying of the noise variance term being based on the estimated position of the ACI within the transmission band relative to the one or more guard subcarriers.

2. The method of claim 1, wherein the determining one or more guard subcarriers are available for ACI reduction further comprises:
determining the signal quality metric; and
determining if the signal quality metric is greater than a designated threshold value.

3. The method of claim 2, wherein the signal quality metric is a received signal strength indicator (RSSI) metric.

4. The method of claim 1, wherein the one or more guard subcarriers comprise a lower guard subcarrier and an upper guard subcarrier relative to the at least one data subcarrier.

5. The method of claim 4, wherein the determining that the ACI is present further comprises:
estimating a strength of the ACI.

6. The method of claim 5, wherein the estimating of the position of the ACI further comprises:
determining a result of a first ratio of a power of the lower guard subcarrier to the total power minus a second ratio of upper guard subcarrier to the total power; and
determining the ACI is on the lower guard subcarrier in response to the result being greater than a first designated value.

7. The method of claim 6, wherein the estimating of the position of the ACI further comprises:
determining the ACI is on the upper guard subcarrier in response to the result being less than a second designated value.

8. The method of claim 7, wherein the estimating of the position of the ACI further comprises:
determining the ACI is on both the lower guard subcarrier and the upper guard subcarrier in response to the result being less than the first designated value and greater than the second designated value.

9. The method of claim 1, wherein the performing of the one or more deweighing operations further comprises:
adjusting a noise variance table for a log-likelihood ratio (LLR) computation.

10. A device comprising:
a transceiver configured to receive a signal, the signal comprising at least one data subcarrier and one or more guard subcarriers, the one or more guard subcarriers being at edges of a transmission band; and
processing logic comprising circuitry configured to:
determine that one or more guard subcarriers are available for adjacent channel interference (ACI) detection based, at least in part, on a signal quality metric;
measure a power of each of the one or more guard subcarriers and a total power of the one or more guard subcarriers;
determine an ACI is present at an estimated position relative to the at least one data subcarrier based, at least in part, on measurements of the one or more guard subcarriers; and
perform one or more deweighing operations comprising modifying a noise variance term of an input-output equation used by a communications protocol for signal encoding/decoding of data, the modifying of the noise variance term being the modifying of the noise variance term being based on the estimated position of the ACI within the transmission band relative to the one or more guard subcarriers.

11. The device of claim 10, wherein the processing logic is further configured to:
determine the signal quality metric; and
determine if the signal quality metric is greater than a designated threshold value.

12. The device of claim 10, wherein the one or more guard subcarriers comprise a lower guard subcarrier and an upper guard subcarrier relative to the at least one data subcarrier.

13. The device of claim 12, wherein the processing logic is further configured to:
estimate a strength of the ACI.

14. The device of claim 13, wherein the processing logic is further configured to:
determine a result of a first ratio of a power of the lower guard subcarrier to the total power minus a second ratio of upper guard subcarrier to the total power; and
determine the ACI is on the lower guard subcarrier in response to the result being greater than a first designated value;
determine the ACI is on the upper guard subcarrier in response to the result being less than a second designated value; and
determine the ACI is on both the lower guard subcarrier and the upper guard subcarrier in response to the result being less than the first designated value and greater than the second designated value.

15. The device of claim 10, wherein the processing logic is further configured to:
adjust a noise variance table for a log-likelihood ratio (LLR) computation.

16. A system comprising:
an antenna;
a transceiver coupled to the antenna, wherein the transceiver is configured to receive a signal, the signal comprising at least one data subcarrier and one or more guard subcarriers, the one or more guard subcarriers being at edges of a transmission band; and
processing logic comprising circuitry configured to:
determine that one or more guard subcarriers are available for adjacent channel interference (ACI) detection based, at least in part, on a signal quality metric;
measure a power of each of the one or more guard subcarriers and a total power of the one or more guard subcarriers;
determine an ACI is present at an estimated position relative to the at least one data subcarrier based, at least in part, on measurements of the one or more guard subcarriers; and
perform one or more deweighing operations comprising modifying a noise variance term of an input-output equation used by a communications protocol for signal encoding/decoding of data, the modifying of the noise variance term being based on the estimated position of the ACI within the transmission band relative to the one or more guard subcarriers.

17. The system of claim 16, wherein the processing logic is further configured to:
determine the signal quality metric; and
determine if the signal quality metric is greater than a designated threshold value.

18. The system of claim 16, wherein the one or more guard subcarriers comprise a lower guard subcarrier and an upper guard subcarrier relative to the at least one data subcarrier.

19. The system of claim 18, the processing logic is further configured to:
estimate a strength of the ACI.

20. The system of claim 19, the processing logic is further configured to:
determine a result of a first ratio of a power of the lower guard subcarrier to the total power minus a second ratio of upper guard subcarrier to the total power; and
determine the ACI is on the lower guard subcarrier in response to the result being greater than a first designated value;
determine the ACI is on the upper guard subcarrier in response to the result being less than a second designated value; and
determine the ACI is on both the lower guard subcarrier and the upper guard subcarrier in response to the result being less than the first designated value and greater than the second designated value.

\* \* \* \* \*